(No Model.)
W. G. SCOTT.
CULTIVATOR.
No. 578,585. Patented Mar. 9, 1897.
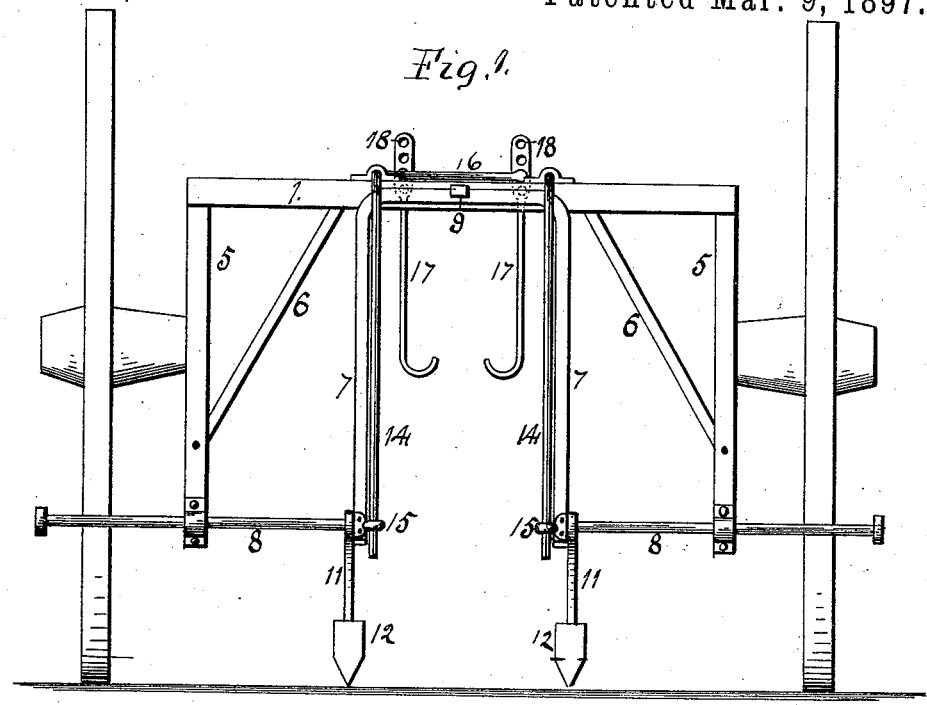
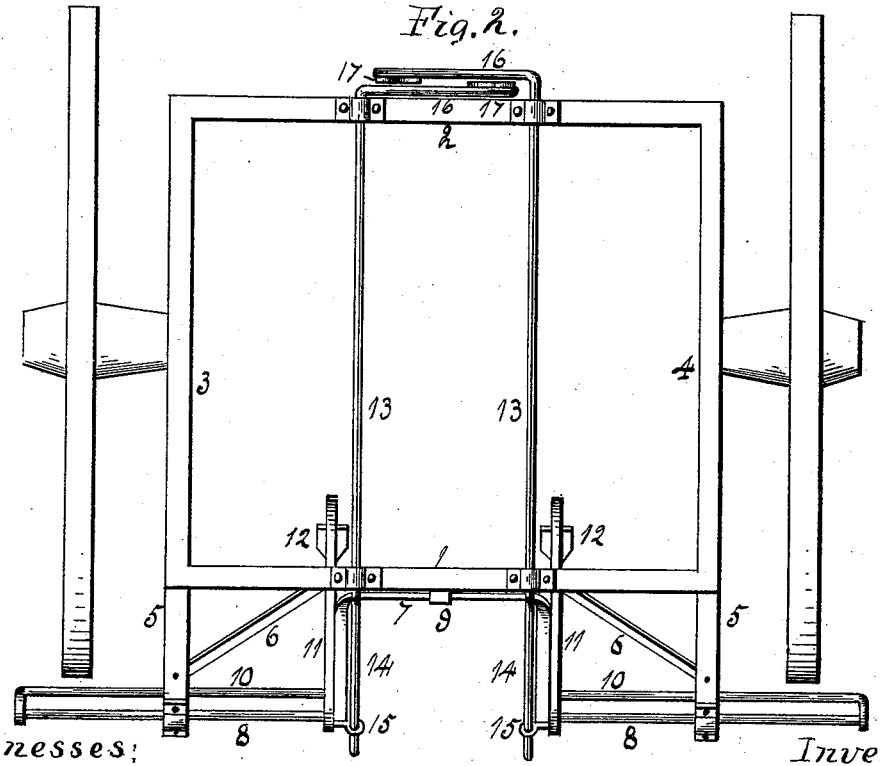
Witnesses:
I. Sovereign
E. Behel
Inventor:
William G. Scott
By A. O. Behel
Atty.

UNITED STATES PATENT OFFICE.

WILLIAM G. SCOTT, OF ROCK DELL, MINNESOTA.

CULTIVATOR.

SPECIFICATION forming part of Letters Patent No. 578,585, dated March 9, 1897.

Application filed October 27, 1896. Serial No. 610,235. (No model.)

*To all whom it may concern:*

Be it known that I, WILLIAM G. SCOTT, a citizen of the United States, residing at Rock Dell, in the county of Olmsted and State of Minnesota, have invented certain new and useful Improvements in Cultivators, of which the following is a specification.

The object of this invention is to construct a cultivator having a set of shovels movable transversely to the line of draft and the arrangement of foot-levers for imparting movement to the shovels.

In the accompanying drawings, Figure 1 is a front elevation of so much of a cultivator as is necessary to show my improvements. Fig. 2 is a plan view of the same.

The main frame consists of the bars 1, 2, 3, and 4, joined in any suitable manner and supported upon carrying-wheels.

From the front bar 1 of the main frame depend two brace-bars 5, extending diagonally forward, each held in position by a brace 6.

A yoke 7 is located centrally of the width of the main frame, and at the front thereof having two horizontal extensions 8, each supported by the diagonal brace-bars 5 in a manner to permit of a horizontal movement. A clip 9, embracing the upper edge of the yoke, holds it in proper relation with the main frame and permits the movement of the yoke. A rod 10 extends parallel with the extensions 8 and connects thereto at its outer end. The inner end of each is connected to a shovel-standard 11, which extends rearwardly and supports a shovel 12. By this construction the shovels are connected and moved in unison.

To the upper surface of the main supporting-frame are secured two rods 13, having their forward ends 14 turned downward and located in eyes 15, secured to the lower ends of the yoke, and having their rear ends 16 bent toward each other in a horizontal plane, and to the rear end of each of these rods is secured a stirrup 17, their upper ends provided with a series of holes 18, permitting the stirrup to be vertically adjusted to suit the operator.

The seat can be located with relation to the stirrups so that the operator can move the shovels by depressing the stirrups, which movement will oscillate the rods 13, and through their connection with the yoke will move the yoke and shovels supported thereby crosswise of the cultivator in either direction.

In the drawings I have not shown the rear set of shovels, as my improvements apply only to the forward set. The parts not shown may be of the construction shown in my application filed August 31, 1896, Serial No. 604,462.

I claim as my invention—

In a cultivator, the combination of a main frame, a supplemental frame located in advance of the main frame having a slidable connection with the main frame transverse to the line of draft and supporting a series of shovels and two rocking foot-levers supported by the main frame having a connection with the slidable frame for moving it.

WILLIAM G. SCOTT.

Witnesses:
BURT W. EATON,
WALTER G. EVANS.